Patented Apr. 24, 1951

2,550,371

UNITED STATES PATENT OFFICE 2,550,371

BITUMINOUS COMPOSITION

Marguerite Naps, Oakland, and Harry J. Sommer, Lafayette, Calif., assignors to Shell Development Company, San Francisco, Calif., a corporation of Delaware No Drawing. Application January 17, 1948, Serial No. 2,963

18 Claims. (Cl. 260—28.5)

This invention relates to compositions comprising bituminous materials, especially asphalts, and polymers of unsaturated nitriles with themselves. More particularly, this invention relates to aqueous emulsions of said compositions. The invention also relates to the foregoing compositions employed as protective sealing coats, for example, on asphaltic surfaces such as asphaltic roadways, paths, floors, airport runways, etc.

One of the serious problems in the asphalt-surfacing industry dealing with those asphalt surfaces which have to bear automotive vehicle traffic is that the various compositions laid down as toppings or roadway surfaces, and known heretofore, have not been satisfactory in withstanding spillage of hydrocarbon fuels and lubricating oils. When used as surface coatings on airport runways, in automobile garages, or on any surface where spillage of oil occurs, all of the known asphaltic compositions have been reported to suffer from the serious defect of softening and dispersing readily in the spilled hydrocarbon fuels or lubricating oils. This situation has resulted in relatively rapid deterioration and disruption of previously known asphaltic surfaces to the extent that they usually became unfit for such use in a short time. On account of these shortcomings the consideration and use of asphaltic pavements for plane-warming-up aprons, for hard standing areas, for hangar floors in connection with airplanes, particularly jet planes, has been prevented. Similarly, there have been objections to the use of asphaltic pavements for garage floors, service station paving, automobile traffic roads, etc.

Although it has been previously suggested to incorporate natural rubber (or derivatives thereof) into asphalts, and although such modified asphalts usually have higher melting points than the corresponding asphalt free of such natural rubber, yet these natural rubber-containing asphaltic compositions possess certain defects. Thus, such compositions normally deteriorate rapidly under action of contacting hydrocarbon fractions, and will usually crack and peel off under the influence of climatic changes. Additionally, none of the asphaltic compositions containing natural rubber (the usual content of which is or must be below 20% by weight and preferably not more than about 5 wt. percent relative to the asphalt) have solved the problem of providing an adherent and lasting sealing coat for asphaltic pavements or surfaces, which modified compositions were at the same time compatible with and sufficiently adhesive to the asphaltic surface below, and which would not disintegrate by the action of hydrocarbon fractions which normally spill or leak from machinery and/or vehicles located on such coated asphaltic surfaces.

It is an object of the present invention to provide novel asphaltic compositions which obviate the above and other defects, and which have unique characteristics which render them particularly suitable as coatings of asphaltic surfaces. It is another object of the invention to provide a seal coat for asphaltic surfaces which will adhere firmly to the foundation surface, and in which the components of the seal coat are not only compatible with each other, but are also compatible with the asphaltic surface itself, said seal coating being of such character that it presents an exposed surface which will not be dispersed and will not deteriorate to any substantial degree under the influence of hydrocarbon oil spillage. Still another object is to provide a seal coat of the character described which does not crack and peel under the influence of air, sunlight, and general weather conditions. A further object is to provide a seal coat having a sufficiently high softening point capable of resisting normal weather temperatures in sub-tropical climates. A still further object is to provide a seal coat which is stable to cold winter temperatures. A still further object is to provide a seal coat which is abrasion-proof and tack-proof to automotive traffic.

It has now been discovered that the above and other objects may be attained by asphaltic compositions containing or comprising an asphalt or similar bitumen and a polymer or polymers of an unsaturated nitrile or mixtures of unsaturated nitriles. The nitrile or nitriles that form the polymers may be suitably unsubstituted or substituted while the resultant nitrile polymer(s) have corresponding substituents. Preferably, a nitrile polymer employed in the composition is a polymer of an alpha,beta-unsaturated nitrile. The nitrile-monomers which are polymerized for the present purposes may be the same or different. The term "polymer" as used in the appended claims includes both interpolymers of the various specified unsaturated nitrile-monomers and also their homopolymers.

The term "asphalt" as used herein includes particularly the pyrogenous asphalts. Although any asphalt may be used in the present compositions, when employing seal-coatings on highly traveled roadways subject to fairly severe usage, it is preferred to employ a "residual asphalt." This term is applied to the semi-solid to solid residues obtained from the distillation of semi-asphaltic and also asphaltic petroleums; "residual asphalt" is also a synonym of petroleum asphalt, petroleum pitch, petroleum residue, road-binder, carpeting asphalt, and seal-coating material asphalt. In general, the preferred "residual asphalts" have a penetration range which extends below a penetration of about 400 at 77° F. More often the "residual asphalts" have a penetration between about 40 and about 360 at 77° F. Particularly effective in making aqueous dispersions of the present compositions are residual asphalts having a penetration between about 40 and about 150 at 77° F. Peak optimum results are usually obtained with asphalts having a penetration of about 40 to about 50 at 77° F., where the hardest type of roadway is desired with the present compositions. Although the "residual asphalts" are preferred as indicated above, the benefits of the present invention are also applicable to some extent to "residual oils," which term herein applies to liquid asphalts having a penetration higher than or extending above about 400 at 77° F. "Residual oil" is synonymous with: asphaltum oil, liquid asphalt, flux oil, roofing flux, dust-laying oil, road oil, petroleum tailings and cutback asphalt. The term "asphalt" as used herein also includes cracked, straight-run, natural asphalts, albino asphalts, non-volatile solvent-fractionated extracts from the refining of petroleum lubricating oils and allied substances, which extracts come under the term "albino asphalts"; also blown asphalts, sulfurized asphalts and sludge asphalts.

Any polymerizable unsaturated nitrile may be advantageously employed in the preparation of the mentioned polymers of one or more species of the generic class of unsaturated nitriles with themselves. Polymerizable unsaturated nitriles that may form the required polymers or interpolymers include: 1,2 unsaturated; 2,3 unsaturated; 3,4 unsaturated et cetera nitriles, which may additionally contain other unsaturation, and also the vinylogs of an organo nitrile where the olefinic double bond, though distant from the nitrile group, is particularly reactive (as for polymerization) by virtue of the well-known vinology effect. An example of a vinylog suitable for the present purposes is a substituted styrene having a nitrile group in the position para to the vinyl group therein. Although (as stated) any unsaturated nitrile may be employed in the preparation of the specified nitrile-polymers for use in the present compositions, the generally preferred class of such nitriles comprises the alpha,beta-unsaturated nitriles having the general structural formula:

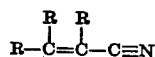

wherein each R may be the hydrogen atom, an alkyl, aryl, aralkyl, alkaryl, alkenyl, aralkenyl, alicyclic, hydrocarbyl or heterocyclic radical, and/or a bromine and/or a chlorine atom. The hydrocarbyl radical is herein-defined as a hydrocarbon radical. The hydrocarbyl, as well as the other organic radicals, may advantageously contain additional nitrile groups. The specified organic radicals may contain or be substituted by substituent groups or elements so long as the substituent group does not substantially interfere with the desired properties afforded by the nitrile group (—C≡N). Among the many alpha,beta-unsaturated nitriles that are suitable for polymerizing with each other and which are applicable in the present compositions, there are: alpha - methacrylonitrile, alpha - ethyl - acrylonitrile, alpha-butyl-acrylonitrile, beta-propyl acrylonitrile, acrylonitrile, crotonitrile, alpha, beta-dimethyl-acrylonitrile, alpha-phenyl-acrylonitrile, alphy-naphthyl acrylonitrile, alpha-chloro - acrylinitrile, alpha - bromo - acrylonitrile, alpha,beta-dichloro-acrylonitrile, et cetera. Polymers of alpha-alkylated acrylonitriles are generally preferred to polymers of other alpha hydrocarbyl and particularly hydrocarbon radical substituted acrylonitriles, and in which case the alpha alkyl group has from one to about six carbon atoms, inclusive, and may be cyclohexyl. Where hydrocarbon radicals other than alkyl but also including alkyl are present, preferably the hydrocarbon radical, particularly the alpha hydrocarbon radical has from one to about eight carbon atoms. Although the alpha,beta-unsaturated nitriles are generally preferred, it is also possible to use polymers of other sub-types of unsaturated nitriles, for example, of nitriles having the formula:

wherein $n$ is preferably an integer from 1 to about 8, and even higher, inclusive, and wherein each R is a substituent as defined above for the alpha,beta-unsaturated nitriles. Additionally the

in the above formula may be constituted of an aromatic ring, e. g. phenylene, of an alicyclic ring, e. g. cycloalkylene, of a heterocyclic ring, e. g. pyridino, et cetera. The monomeric nitrile units of the polymer may each contain more than one, and from one to about three, or even a higher number of nitrile groups. Where a polymer of an alpha organo nitrile, i. e. an alpha-organic radical-substituted unsaturated, preferably alpha,beta-unsaturated nitrile is employed, it is particularly preferable that said radical have from one to about eight carbon atoms and a radical-weight of below about 140. An alpha organo group is defined by hydrocarbyl, hydrocarbon, and heteroatom-containing organic groups which latter may contain, or be attached to the basic unsaturated nitrile structure, by suitable atoms such as oxygen, sulfur, nitrogen, et cetera. In fact, any polymer of one or more unsaturated nitriles can be effectively employed in the instant asphaltic compositions provided the nitrile-polymer has at least a nitrile group content (based on the molecular weight of said polymer as a whole) of approximately 15 wt. per cent. This percentage is equivalent to the ratio of the nitrile group content to the molecular weight of the polymer. More particularly effective are those nitrile-polymers which have a ratio of nitrile group content to the molecular weight of the polymer or of each polymeric molecule, of between about 25 wt. per cent and about 50 wt. per cent. Higher weight per cent contents of the nitrile group content relative to the molecular weight of the polymer are generally not suitable because with too high a nitrile group content the polymer is insufficiently adhesive and also becomes incompatible with the asphalt as a whole.

Generally, the present nitrile-polymers may be produced by polymerizing any unsaturated nitrile or mixtures of such nitriles in aqueous emulsion so long as the resultant polymer shows upon analysis to have a nitrile radical content of at least about 15 wt. percent.

Any one of the present suitable nitrile-polymer resins present in an aqueous dispersion, can be separated out in bulk by simple precipitation with an electrolyte, or other conventional means. The separated nitrile-polymer resin is well characterized by its thermoplastic properties. Thus, it is well characterized by its flow-temperature as determined by Method A of the American Society for Testing Materials under the designation: A. S. T. M. D–569–44T, reference "A. S. T. M. Standards 1944," pages 1647–1650. The results of this flow test are reported as the temperature at which flow of the resin is at a rate of one inch in two minutes under the specified A. S. T. M. conditions. The nitrile-polymer thermoplastic resins suitable for the present purposes preferably have such an A. S. T. M. flow-time temperature of between about 130° C. and about 160° C. Additionally, nitrile-polymer resins having such a flow-temperature of between about 120° C. and about 175° C. are also highly effective in the present asphalt compositions. Further, nitrile-polymer resins with such flow-temperatures as low as 110° C. and as high as above 175° C. where the latter represents a value of 0.2 inch flow at 175° C. are suitable in the instant asphalt compositions, while resins having lower and higher flow-temperature characteristics are also applicable depending upon minor details, modified conditions of a specific application of the asphalt-nitrile-polymer mixture, as would then follow within the skill of the artisan, et cetera.

The present nitrile-polymers differ significantly from copolymers of unsaturated hydrocarbons and unsaturated nitriles. Thus, the present nitrile-polymers are not elastomeric but instead are thermoplastic. In this connection they have many of their thermoplastic properties in common with those of polymethyl methacrylate resins. Similarly, the present nitrile-polymers are hard and rigid at about 25° C. instead of extensible and elastomeric as is a copolymer of butadiene and acrylonitrile, for example.

In the above connection also, butadiene-methacrylonitrile copolymer has been found advantageous as a softening agent or plasticizer of the present nitrile-polymers, particularly of polymethacrylonitrile, in the present asphalt compositions.

Nitrile-polymers have such a high plasticity range that their plasticity cannot normally be determined by the Mooney plasticity method described in "Industrial and Engineering Chemistry," vol. 2, page 147, 1934 edition, and also by Vanderbilt in "Rubber Handbook," page 254, 1942 edition. When one attempts to do so, an unpracticably high temperature has to be used to obtain softening of the nitrile-polymers sufficient for some flow. This results in such a high temperature that decomposition, break-down and scorching of the nitrile-polymers occur, thus making the Mooney method entirely impossible.

The best physical property that can be made use of for characterizing the present suitable nitrile-polymer resin is considered to be the specific viscosity of solutions of the present nitrile-polymer resins in acetone. In turn, that specific viscosity is directly related, by means of an empirically verified mathematical equation, to the intrinsic viscosity. The term specific viscosity is a term well understood in the art of high polymer chemistry and specifically is defined as follows:

Specific viscosity $=$ $$\frac{\left[\begin{array}{c}\text{viscosity of solution of resin}\\\text{at a given concentration}\end{array}\right]-\left[\begin{array}{c}\text{viscosity of}\\\text{solvent}\end{array}\right]}{[\text{viscosity of the solvent}]}$$

An individual specific viscosity depends upon the amount of resin one dissolves in a specific test-determination. In the present case, all specific viscosities were determined for concentrations expressed in number of grams dissolved in 100.0 milliliters of acetone. More fundamental is the intrinsic viscosity which is obtained as follows: The value of the quotient from specific viscosity divided by concentration is plotted as ordinate against the value of the corresponding concentration as abscissa. Plotting of at least three values of different specific viscosities at different concentrations for a given nitrile polymer has been found to be satisfactory. A curve is drawn through the plotted points and extended to intersect the ordinate (zero concentration). The value of the ordinate at this point of intersection is the intrinsic viscosity. An intrinsic viscosity of 0.8 for a present nitrile-polymer was found to correspond to an average molecular weight of 100,000. An intrinsic viscosity of 3.65 corresponds to an average molecular weight of 913,000. These values are indicative of particularly suitable nitrile-polymers. Values of intrinsic viscosity for many other specific nitrile-polymer resins suitable for the present purpose were also obtained, including those for many within an intermediate range of molecular weight; also intrinsic viscosity for a molecular weight as low as 46,300, and for molecular weights above 1,000,000, for example, approximately 2,000,000.

The empirical relationship between intrinsic viscosity of the present nitrile-polymers dissolved in acetone at 20° C. and average degree of polymerization, it was found, can be put in the form of a graph according to the method of W. Kern and H. Fernow described in "Rubber Chemistry and Technology," vol. 18, pages 267–279, 1945.

Average molecular weight determinations (for the present nitrile-polymer resins obtained, as disclosed above) showed that nitrile-polymers suitable for the present purposes preferably have an average molecular weight of between about 100,000 and about 1,000,000. Additionally, nitrile-polymer resins having an average molecular weight between about 75,000 and about 2,000,000 are also highly effective in the present asphalt compositions. Further, nitrile-polymer resins with an average molecular weight as low as approximately 45,000 and also as high as 3,000,000 are suitable in the instant asphalt compositions.

In further accordance with this invention, it was particularly discovered that aqueous dispersions containing both an asphalt and one or more of the aforesaid polymers of an unsaturated nitrile are especially effective compositions for attaining the desired objects set forth above. The aqueous dispersions of the present invention are of particular utility and superior characteristics because these dispersions can be simply painted, sprayed, brushed on or otherwise distributed over an asphaltic surface with the desired results. The present compositions do not necessitate vulcanization, application of heat, or special machinery, and hence substantial savings in time and costs are effected.

The content of the present nitrile-polymer resins in the present asphaltic compositions may vary within relatively wide limits, depending in part upon the specific nitrile-polymer used, the detailed purpose for which a given composition is employed, et cetera. Suitable ranges of content of the present nitrile-polymer have already been described in the above, and for a given purpose at hand, the most suitable concentration of nitrile-polymer within those ranges will be readily determinable according to the skill of the art in the light of this specification.

In general, an aqueous dispersion of an asphalt and a nitrile-polymer is satisfactory or suitable in the present invention providing at least approximately 5% by weight of the nitrile-polymer is present, said weight per cent being based on the combined weights of the asphalt and said polymer. Thus where 5 wt. percent of nitrile-polymer is present, about 95 wt. per cent of asphalt is present in the mixture. In addition to these weight per cents, other agents may or may not be present according to the conventional skill of the art on asphalt emulsions or dispersions. In any case the solid materials in the present compositions are predominantly the mixtures of asphalt and nitrile-polymer. Where direct application of the present aqueous dispersions of mixtures of asphalt and nitrile-polymer are made to asphaltic pavements, in general, such a mixture should have between about 5 wt. per cent and about 60 wt. percent of the nitrile-polymer, this wt. per cent being based upon the combined weights of the asphalt and the polymer. As brought out hereinafter, for other purposes as well as similar or allied uses, the content of the nitrile-polymer may go higher than 60 wt. per cent. As a preferred embodiment, an aqueous dispersion of one or more of the present nitrile-polymer resins is introduced into an aqueous dispersion of an asphalt (or vice versa) so as to obtain a ratio of the nitrile polymer to the asphalt of between about 15% and about 40% by weight, based upon the combined weights of the asphalt and the polymer. Optimum results are obtained in most cases for the purposes described herein when a ratio of the nitrile polymer to asphalt is approximately 1 to 3 and also 1 to 2 (i. e. 25 wt. per cent and 33 wt. per cent of the polymer, respectively). The resultant dispersion of nitrile polymer and asphalt is simply painted onto an asphaltic surface so as to obtain a normal painted thickness of coating. However, it may be desirable to apply several consecutive coats of the present compositions. The building up of two or more consecutive coats containing the present nitrile-polymers can be desirably modified by applying increasingly higher concentrations of the nitrile polymer in the consecutive coats until the final coat exposed to traffic consists essentially of about 95 wt. per cent nitrile-polymer and about 5 wt. per cent asphalt; in some cases, the final coat exposed to traffic may desirably consist substantially or essentially only of the polymeric nitrile.

Where aqueous dispersions of asphalt are formed in the presence of soaps, it is preferable to have stabilizers such as caseinates or alginates present in the dispersion, and to incorporate a small amount, to suit the purpose in hand, of a soluble alkaline hydroxide, e. g. an alkali metal or an alkaline earth metal hydroxide. Ammonium hydroxide, and also organic quaternary nitrogen bases, may be used to advantage in some cases. Clay-containing dispersions of asphalt in which the clay is capable of ion exchange are also useful in preparing the present compositions essentially containing the specified polymeric nitriles.

Methods of emulsification, i. e. of obtaining aqueous dispersion of an asphalt and of mixing a present nitrile polymer therein, are conventional. The details of obtaining such aqueous dispersions, as of the asphalt, and of the nitrile polymer separately, are well known in the art and do not require further description here. A relatively fine emulsion, such as may be obtained by conventional split emulsification, is usually desirable, since a fine emulsion allows a more thoroughly intimate and homogeneous dispersion of the emulsified asphalt particles through and together with the later-added emulsion of nitrile polymer.

Emulsifying agents used for the asphalt emulsions are any of the anion-active and cation-active agents conventionally used for this purpose. Suitable emulsifiers include alkaline solutions of alkali metal salts or soaps of tall oil, alkali metal rosinates, et cetera. The amounts of the emulsifying agent generally employed, is between about 0.25 wt. per cent and about 20 wt. per cent based on the dry weight of the asphalt. Between 0.5 wt. per cent and about 5 wt. per cent of the emulsifying agent, on the same basis, is preferred. Some asphalts emulsify in alkaline solution without addition of any emulsifying agent. As to emulsions of the nitrile-polymers, the emulsifying agents employed therein also include any of the conventional surface-active agents, including both the cation-active and anion-active types. Among these representative suitable substances are sodium lauryl sulfate, sodium oleate, ammonium stearate, et cetera. The amounts of emulsifier used generally are within the same range as that employed for the asphalt emulsion. In most cases, when employing surface-active resins, between about 0.25 wt. per cent and about 1 wt. per cent of the agent, based on the dry weight of the polymer is sufficient. Higher amounts may be used, as up to 2% and 5%, etc., and are more suitable with the older type of simple soaps. The emulsifying agents for each of the nitrile-polymer emulsions and the asphalt emulsions, respectively, may be the same or different agents. If they are different, they are selected within the skill of the art so as to be mutually compatible.

The aqueous dispersions of nitrile-polymer resins and asphalt described herein have the following advantages when used as a seal and protective coating on asphaltic pavements or surfaces. Before application, these aqueous dispersions are stable and compatible over periods of six months or more; hence, they can be safely stored for long periods of time. The present novel compositions do not require the presence of added vulcanization-promoting agents, vulcanization ingredients, accelerators, plasticizers, fillers, antioxidants, waxes, cation-active materials, et cetera. In fact, the present compositions are employed without the presence of any vulcanizing agents. In some cases a minor amount, usually less than about 2 wt. per cent of an antioxidant, e. g. phenyl-beta-naphthylamine, may be incorporated without any detrimental results. No necessity exists for incorporating either a present nitrile-polymer resin or asphalt into each other by a solution in a solvent, because it has been discovered that it is preferable to have water as the continuous phase in the colloidal and emulsified system. There is no criticality in the mode in which an emulsion of the nitrile-polymer is mixed with an emulsion of the asphalt. The nitrile-polymer-asphalt emulsion is a water-bound paint; it was found to have good adhesion properties. No curing problem exists; as soon as water has dissipated sufficiently from the emulsion applied to a surface and the residual adherent coat has come to equilibrium, the surface thus coated is ready for use.

Additional particular advantages of the present mixtures of asphalt and a nitrile-polymer are: when present as a coating over an asphalt base, the resultant coating from the mixture is substantially a completely impervious seal; this acts as an effective anti-oxidant for the asphalt, because oxygen from the air is blanketed away from the asphalt. As a result, tests have shown that even after periods of several months, the asphalt under the present seal-coat mixtures remains in substantially the same state, that is, unoxidized, as when it was first applied. Thus, unlike unprotected asphalts, those asphalts which are protected by the present seal-coat mixtures, remain flexible and do not age, harden, brittle and crack. In view of these particular advantages of the present mixtures of asphalt and nitrile-polymers, these mixtures are peculiarly applicable in providing seal-coats for flexible-type of asphalts that are subjected to great variations in temperature, such as repeated alternating cycles of extreme heat and cold. In such cases the flexible-type of asphalt required to withstand such temperature changes is often produced by modifying the asphalt base with a light lubricating oil therein to make it flexible; by coating over the thus-produced flexible asphalt with one of the present mixtures of nitrile-polymer, the flexibility of the asphalt under the seal-coat is maintained.

In general it is undesirable to coat the present mixtures of asphalt and nitrile-polymer over a volatile solvent-containing asphalt, or a liquid asphalt that contains volatile constituents, because the volatile materials therein will push up against the incipient forming seal-coat on account of climate and disrupt or spoil the seal-coat. Thus, normally, the present mixtures are not to be applied over freshly laid cutback-asphalts. However, the present mixtures can advantageously be coated over well-cured cutback-asphalts or other liquid asphalts so long as coatings or pavements from the latter have aged sufficiently that volatile materials have been eliminated therefrom by climatic temperatures.

Although, as specified, no modifiers such as necessarily are added to some synthetic nitrile-rubbers need be added to the present asphaltic compositions, it is obvious that various materials may be added to the present compositions without departing from the scope of the present invention so long as the materials added according to the skill of the art allow retention of the dominant desired qualities of the present mixtures. For example, minor amounts of plasticizers, fillers, waxes, cation-active materials, and various resins or dispersions of resins, may be incorporated with or added to the present compositions so long as they retain their hydrocarbon-resistant quality and their compatibility with and adhesion to an underlying asphaltic coat, e. g. asphalts known to the prior art.

The described present mixtures may be employed in the form of more or less concentrated dispersions in liquid vehicles or fluidizable media other than those particularly disclosed. These will be obvious to a skilled artisan. Thus, for example, the present compositions may be utilized alone or in combination with other known coating compositions, such as roadway-coating compositions which contain natural rubber, or derivatives thereof, and/or polymers of diolefinic hydrocarbons such as polymers of butadiene with itself.

The present compositions, as deposited from either aqueous dispersions or from dispersions or solutions containing little or no water, are highly useful as coatings or impregnants of cloth, paper, various absorbent or adsorbable materials. These compositions may even bind themselves or be bound to Portland cement concrete, to various conventional concretes, to glass, porcelain, ceramics, et cetera.

The instant compositions are also applicable as their solutions, partial solutions, dispersions, etc. in various suitable liquid or solid vehicles, particularly of the type of ketones (which may be aliphatic or aromatic or mixed aliphatic-aromatic ketones), aromatic hydrocarbons (which may be admixed with a considerable amount of aliphatic hydrocarbons), and halogenated, such as brominated or chlorinated, aliphatic hydrocarbons.

The present compositions may also be mixed with or partially absorbed on such solid materials as sand, clay, bentonite, carbon black and discrete particles of natural or compounded rubber of caoutchouc. Where incorporating sand into the present aqueous dispersions, it is not necessary (as it is in so many other instances of asphaltic compositions) to prewet the sand with a dilute caseinate in order to enable ready mixing.

It was found that preferably the aqueous dispersions of the nitrile-polymer and of asphalt were thoroughly mixed, then between about 0.5% and about 1% by weight of casein based on the weight of asphalt present, was added as a 10% by weight dispersion of casein in water containing approximately 0.6% by wt. of sodium hydroxide, and then an appropriate conventional amount of sand was added. In this way ready mixing was obtained, followed by satisfactory results in application of such a mixture as a coating of an unsealed asphaltic concrete. On the other hand, it was not necessary to add any casein when an aqueous dispersion of the present nitrile-polymers and asphalt had zero demulsibility to 0.1 N calcium chloride, as defined by the American Society of Testing Materials specification D-244-42, pages 16, 17, and 18; and such a dispersion mixed well with sand, showed good stability, and gave good results in seal coating an asphaltic concrete.

The present compositions are also useful in soil-stabilization as in impregnation of adobe bricks; the compositions are useful, too, in ground fixation and impermeabilization of sand. In the latter case, a readily hydrolyzable ester is usually present, e. g. ethyl formate, in an aqueous emulsion of the bituminous composition. This emulsion travels several feet through the ground or sand, the emulsion then breaks, and deposits the bituminous composition as a seal or barrier to further flow of liquids.

Other variations within the scope of the present invention will be apparent to skilled artisans, such as mixing the present nitrile-polymers together with molten asphalt and dispersing the fluidized mass onto asphaltic or other surfaces; painting a vulcanizing oil-soluble agent onto an asphaltic or other amenable surface and then applying a specified nitrile-polymer-in-asphalt composition; applying a thermosetting resin onto an asphaltic or other amenable surface and then applying thereto one or more of the present compositions.

For purposes of further illustration, reference will be had to the following specific examples, it being understood that there is no intention of being limited by the specific ingredients or conditions disclosed therein. The percentages specified in the following examples are percentages by weight unless otherwise specified.

*Example I*

An aqueous dispersion of polymethacrylonitrile in the form of a latex having about 23.4% total solids, in which figure is included approximately 23% polymethacrylonitrile and about 0.5% of sodium lauryl sulfate as the emulsifying agent, was stirred into an aqueous emulsion of asphalt containing about 60% asphalt and as emulsifying agent, about 2% of sodium salts of tall oil (i.e. tallates) based on the weight of the asphalt. The asphalt had a penetration at 700° F. averaging in a range of from about 40 to about 50. The mixing was made in the ratio of 2.56 gallons of the aqueous dispersion of polymethacrylonitrile to 3 gallons of the asphalt emulsion, thus furnishing a ratio of one part of polymethacrylonitrile to three parts by weight of asphalt. The resultant mixture contained 43.2% of water. This mixture was coated onto asphaltic concrete panels at the rate of approximately 0.2 gallon per square yard. The coatings thus formed, upon drying, were approximately $\frac{1}{32}$ of an inch in thickness and were found to adhere satisfactorily to the asphaltic concrete. These coated panels, after air-drying in outdoor climate at about 50° F. to about 70° F. for about 48 hours, were flooded with kerosene for a period of five hours. The same treatment was effected upon each of several asphaltic concrete panels that had been coated and dried by the same technique but with three other different compositions. These compositions were: (1) composition A, composed of a conventional asphaltic paint having an oil base and japan therein, which japan is a lacquer made by heating a linseed drying oil with litharge and incorporating a metallic siccative therein with an asphaltite such as gilsonite, and thinning somewhat with turpentine or naphtha; (2) composition B, composed of a conventional air-drying synthetic resin varnish having an oil base; and (3) composition C, composed of a coal tar pitch in a clay-based aqueous emulsion. Control panels of uncoated asphaltic concrete were also tested. Upon effecting the described kerosene-flooding test, the uncoated asphalt and the panel coated with composition C each failed completely. In these cases most of the asphalt present was disintegrated from these panels. The asphaltic panels coated with composition A and with composition B, respectively, each softened and swelled to give an unsatisfactory coating. However, all of the panels coated with the mixture of asphalt and nitrile-polymer, viz. polymethacrylonitrile, held up satisfactorily under the test; these panels remained firm and the coatings thereon were substantially the same after the kerosene test as before it. Additionally, asphaltic concrete panels were also coated with aqueous emulsified mixtures of asphalt and polymethacrylonitrile which mixtures each contained 5%, 10%, 15%, 20%, 25%, and 30%, respectively, of the polymethacrylonitrile relative to the weight of the asphalt on a dry basis, said weight per cents being based upon the combined weights of the asphalt and the nitrile-polymer. In preparing these additional mixes, blending was easily accomplished. All of these additional blends also produced coatings which were satisfactory under the above-described kerosene test. Both the blends and the coatings were investigated in the same manner as for the above.

*Example II*

Comparative tests were effected of a polymethacrylonitrile latex in water containing 18 wt. per cent of the nitrile-polymer mixed with aqueous asphalt emulsion having about 60% asphalt and about 40% water such that 1 part by weight of the polymethacrylonitrile and 3 parts by weight of asphalt on a dry basis were present, and also of a 30% arcylonitrile-70% butadiene copolymer mixed in aqueous dispersion with asphalt having a ratio of 1 part of copolymer and 3 parts of asphalt on a dry basis. The asphalt employed in these cases had a penetration at 77° F. ranging from approximately 40 to 50. These comparative tests were carried out by preparing a number of test-discs of a sand mix type of asphaltic pavement on which were then brushed the above-described aqueous dispersions to be tested. The thus-coated discs were dried in an oven at 140° F. for 18 hours, then removed, allowed to cool to room temperature (about 75° F.) and then tested to determine the adhesion of the seal-coatings to the asphaltic base. The discs were flooded with a conventional Diesel fuel for an 18-hour period at 77° F. These tests showed that the resistance of these experimental discs to the action of the Diesel fuel was excellent in all cases. However, the disc coating containing the copolymer of acrylonitrile-butadiene was tacky after the oven-drying at 140° F. Also, it was found that experimental plats of airplane runways containing a coating of asphalt mixed with the copolymer of acrylonitrile-butadiene in the same ration of parts by weight became tacky after application to the asphaltic pavement where high temperatures prevail, such as are encountered in the southern part of California. As a consequence, under such conditions of prolonged heat and high climatic temperatures, pieces of the seal-coat containing the copolymer stuck to the tires of parked trucks and were pulled up when the latter were moved. On the other hand, the tackiness which afforded such difficulties, was absent in the case of coatings of mixtures of asphalt and polymethacrylonitrile. Similarly, discs coated with the above-described mixture of asphalt and polymethacrylonitrile were not tacky during or after the 140° F. 18-hour oven-heating treatment, while concomitant features were that these discs had excellent adhesion to the asphaltic base and also resisted the Diesel fuel extremely well.

*Example III*

A ratio of one part of polymethacrylonitrile to three parts by weight of asphalt on a dry basis when present in an aqueous dispersion was tested as a seal-coat painting upon asphaltic pavement subjected to traffic. The painting was applied in the conventional manner employed in applying an asphalt painting with broom-brushes. The coating was allowed to come to equilibrium and to dry in about 48 hours. It was found that the resultant coating was abrasion-resistant to automobile traffic thereover and that these coatings enabled mechanical cleaning up of spillage of gasoline, kerosene or Diesel fuel without mechanical damage to these seal coats. In these two respects these seal coats were superior to coatings made with asphalt containing a wide variety of percentages of acrylonitrile-butadiene copolymer. The polymethacrylonitrile-asphalt emulsions employed had viscosities ranging from about 20 to about 40 seconds Saybolt Furol at 77° F. To obtain a normal painted thickness desirable for the purpose (i. e. about 1/32 inch thick), several applications were made. To overcome the thinning out on brushing of the above low viscosity emulsions, in some cases a thickener, sodium alginate, was added to the emulsions. A suitable concentration of sodium alginate was 0.25% based on the asphalt content of the mix; this amount of alginate raised the viscosity of the nitrile-polymer-asphalt emulsions to a value in a range between about 75 and about 200 seconds Saybolt Furol at 77° F. Too much thickener was found detrimental. All of the seal coats resulting from the application of the above aqueous asphalt emulsions containing polymethacrylonitrile were extremely resistant to kerosene distillates and showed no deterioration even when the seal coats were allowed to stand 48 hours with a 1/2 inch height of kerosene on them.

We claim as our invention:

1. A composition comprising an aqueous dispersion of a mixture of an asphaltic material having a penetration between about 40 and about 150 at 77° F. and therewith from about 15% to about 40% by weight, based on the weight of said mixture, of a homopolymer of alpha methyl acrylonitrile.

2. A composition comprising an aqueous dispersion of a mixture of a residual asphalt and between about 15% and about 40% by weight, based on the weight of said mixture, of a homopolymer of alpha methyl acrylonitrile.

3. A composition comprising an aqueous dispersion of a mixture of an asphalt and from about 5% to about 95% by weight of a homopolymer of alpha methyl acrylonitrile, said weight per cent being based on the combined weights of the asphalt and said homopolymer.

4. A composition comprising an aqueous dispersion of a mixture of an asphalt and from about 5% to about 95% by weight of a homopolymer of alpha-chloro-acrylonitrile, said weight per cent being based on the combined weights of the asphalt and said homopolymer.

5. A composition comprising an aqueous dispersion of a mixture of an asphalt and from about 5% to about 95% by weight of a homopolymer of an alpha-alkyl-acrylonitrile wherein the alpha alkyl group has from one to six carbon atoms, said weight per cent being based on the combined weights of the asphalt and said homopolymer.

6. A composition comprising an aqueous dispersion of a mixture of an asphalt and from about 15% to about 40% by weight of a homopolymer of an unsaturated aliphatic hydrocarbyl nitrile in which polymer the ratio of nitrile group content relative to the weight of the polymer is from about 15% to about 50% by weight, the weight per cent of the polymer being based upon the combined weights of the asphalt and the polymer.

7. A composition comprising an aqueous dispersion of a mixture of an asphalt and from about 15% to about 40% by weight of a homopolymer of an alpha,beta-unsaturated aliphatic hydrocarbyl nitrile in which polymer the ratio of nitrile group content relative to the weight of the polymer is from about 15% to about 50% by weight, the weight per cent of the polymer being based upon the combined weights of the asphalt and the polymer.

8. A composition comprising a mixture of an asphalt and from about 5% to about 95% by weight of a polymer of the group consisting of homopolymers of unsaturated nitriles and copolymers prepared from a mixture consisting of unsaturated nitriles, in which polymers the ratio of nitrile group content to the weight of the polymer is between about 15 weight per cent and about 50 weight per cent, the weight per cent of the polymer being based upon the combined weight of the asphalt and the polymer.

9. An article of manufacture having protective properties against deterioration occurring by contact of said article with liquid or vaporous hydrocarbons, said article comprising an asphaltic surface and thereon a surface coating of a mixture of an asphalt and between approximately 5% and about 95% by weight of said mixture of a polymer of the group consisting of homopolymers of unsaturated nitriles and copolymers prepared from a mixture consisting of unsaturated nitriles, in which polymer the ratio of the nitrile group content to the weight of the polymer is between about 15 weight per cent and about 50 weight per cent, the total weight per cent of the polymer being based upon the combined weights of the asphalt and the polymer.

10. A composition comprising an aqueous dispersion of a mixture of an asphalt and from about 15% to about 40% by weight of a copolymer prepared from a mixture consisting of unsaturated nitriles in which polymer the ratio of nitrile group content relative to the weight of the polymer is from about 15% to about 50% by weight, the weight per cent of the polymer being based upon the combined weights of the asphalt and the polymer.

11. A composition comprising an aqueous dispersion of a mixture of an asphalt and between about 5% by weight and about 60% by weight of said mixture of a copolymer prepared from a mixture consisting of unsaturated aliphatic nitriles.

12. A composition comprising an aqueous dispersion of a mixture of an asphalt and from about 5% to about 60% by weight of a copolymer prepared from a mixture consisting of unsaturated nitriles, in which polymer the ratio of nitrile group content to the weight of the polymer is from about 15% to about 50% by weight, the weight per cent of the polymer being based upon the combined weights of the asphalt and the polymer.

13. A composition comprising a mixture of an asphalt and from about 5% to about 60% by weight of a copolymer prepared from a mixture consisting of unsaturated nitriles, in which polymer the ratio of nitrile group content to the molecular weight of the polymer is from about 15% to about 50% by weight, the weight per cent of the polymer being based upon the combined weights of the asphalt and the polymer.

14. A composition comprising an aqueous dispersion of a mixture of an asphalt and from about 5% to about 95% by weight of a copolymer prepared from a mixture consisting of alpha,-beta-unsaturated aliphatic nitriles, said weight per cent being based on the combined weights of the asphalt and said polymer.

15. A composition comprising an aqueous dispersion of a mixture of an asphalt and from about 5% to about 95% by weight of a copolymer prepared from a mixture consisting of alpha-hydrocarbyl acrylonitriles, wherein said hydrocarbyl radicals have, respectively, from 1 to 8 carbon atoms, said weight per cent being based on the combined weights of the asphalt and said polymer.

16. A composition comprising an aqueous dispersion of a mixture of an asphalt and from about 5% to about 95% by weight of a copolymer prepared from a mixture consisting of alpha-organo-alpha,beta-unsaturated nitriles, wherein said organo radicals have, respectively from 1 to 8 carbon atoms and a radical weight below about 140, said weight per cent being based on the combined weights of the asphalt and said nitrile polymer.

17. A composition comprising an aqueous dispersion of a mixture of an asphalt and from about 5% to about 95% by weight of a copolymer prepared from a mixture consisting of alpha,beta-unsaturated nitriles, said weight per cent being based on the combined weights of the asphalt and said polymer.

18. A composition comprising an aqueous dispersion of a mixture of an asphalt and from about 5% to about 95% by weight of a copolymer prepared from a mixture consisting of alpha-methyl acrylonitrile and an unsaturated nitrile, said weight per cent being based on the combined weights of the asphalt and said polymer.

MARGUERITE NAPS.
HARRY J. SOMMER.

REFERENCES CITED

The following references are of record in the file of this patent:

UNITED STATES PATENTS

| Number | Name | Date |
| --- | --- | --- |
| 2,160,054 | Bauer et al. | May 30, 1939 |
| 2,337,339 | McCluer et al. | Dec. 21, 1943 |

FOREIGN PATENTS

| Number | Country | Date |
| --- | --- | --- |
| 71,955 | Norway | Apr. 14, 1947 |

OTHER REFERENCES

Asphalt and Allied Substances by Abraham, fourth edition, 1938. Publ. by D. Van Nostrand Co., New York, N. Y. Pages 52, 62, and 63.